UNITED STATES PATENT OFFICE.

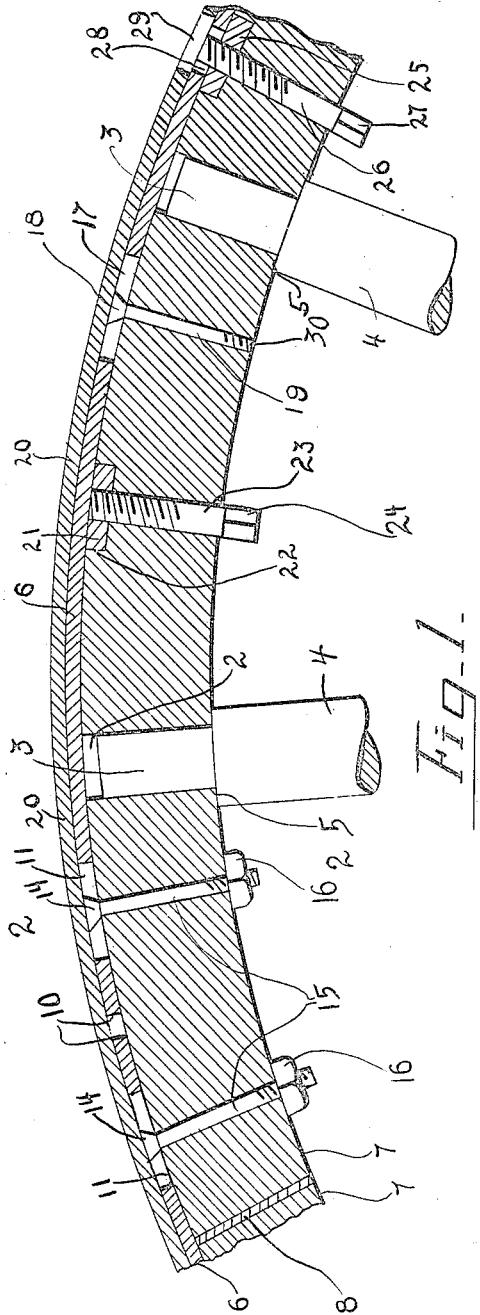
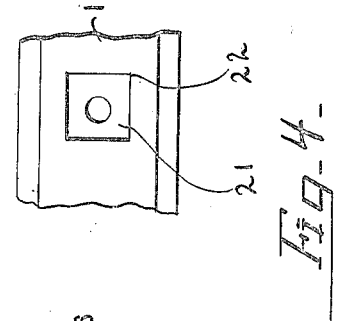
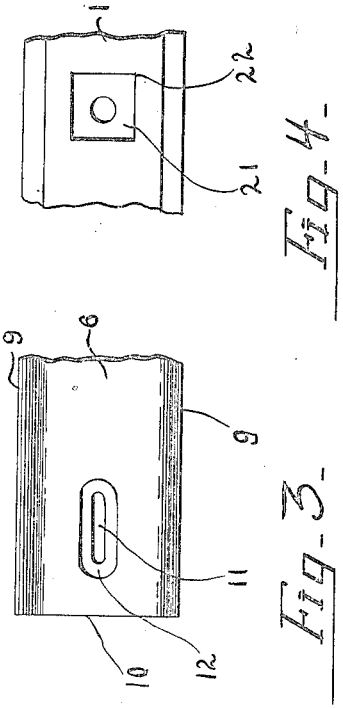
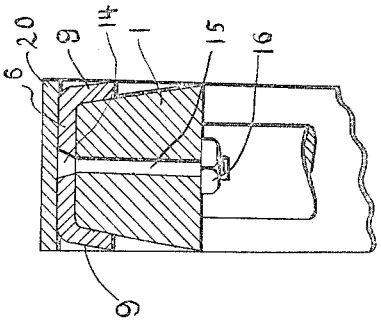

FRED REESE, OF EUTAW, ALABAMA.

RIM AND TIRE FOR WHEELS.

1,231,649. Specification of Letters Patent. Patented July 3, 1917.

Application filed August 9, 1916. Serial No. 114,001.

*To all whom it may concern:*

Be it known that I, FRED REESE, a citizen of the United States, residing at Eutaw, in the county of Greene and State of Alabama, have invented a new and useful Rim and Tire for Wheels, of which the following is a specification.

The device forming the subject matter of this application is a rim and tire for vehicle wheels, and one object of the invention is to provide a structure of this sort which will not become rim-bound, causing a distortion of the wheel.

Another object of the invention is to provide novel means whereby looseness due to wear may be taken up.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows in vertical longitudinal section, a portion of a wheel constructed in accordance with the present invention, parts appearing in elevation;

Fig. 2 is a cross section on the line 2—2 of Fig. 1;

Fig. 3 is a fragmental top plan of the inner rim; and

Fig. 4 is a fragmental top plan of the felly.

In carrying out the present invention there is provided a felly 1 which is ordinarily made of wood, the same being provided with openings 2 adapted to receive the tenons 3 of the spokes 4 having shoulders 5 bearing against the inner curve of the felly 1. The ends of the felly 1 are denoted by the reference character 7 and between the ends 7 of the felly may be introduced shims 8.

Surrounding the felly 1 closely is an inner rim 6 having side flanges 9 which overlap the side faces of the felly 1. Owing to the fact that the inner rim 6 includes the side flanges 9, the felly will not bulge outwardly, opposite to the openings 2 in which the tenons 3 of the spokes are received, it being a matter of common knowledge that wheel fellies frequently bulge out at the points indicated, thereby rendering useless, a felly which is otherwise satisfactory.

The ends of the inner rim 6 are denoted by the numeral 10 and are provided with slots 11 which are elongated circumferentially of the wheel. The slots 11 are beveled as shown at 12 to receive the heads 14 of the bolts 15 passing through the rim 6 near to its ends 10, the bolts 15 passing through the felly 1 and being provided with nuts 16 which bear against the inner curve of the felly. After the wheel has been completed, the nuts 16 are removed, in a manner which will be pointed out hereinafter. The inner rim 6 may be provided at suitably spaced distances around the wheel with slots 17 like the slots 11, and adapted to receive the heads 18 of bolts 19 passing through the felly 1 and provided with nuts like the nuts 16.

The invention comprises a tire 20 which like the inner rim 6 is made of metal, the tire 20 preferably being shrunk (either hot or cold) onto the inner rim 6. Nuts 21 are seated in recesses 22 formed in the outer edge of the felly 1. Screws 23 pass through the felly 1 and are threaded into the nuts 21. The screws 23 are adapted to bear against the inner face of the rim 6, and are provided with turning heads 24 located adjacent the inner curve of the felly 1. Nuts 25 are mounted in the felly 1 in the manner hereinbefore described. Screws 26 pass through the felly 1 and are threaded into nuts 25. The screws 26 include turning heads 27 located near the inner curve of the felly 1. The other ends of the screws 26 pass loosely through openings 28 formed in the inner rim 6 and are adapted to be received in openings 29 formed in the tire 20, and elongated longitudinally or circumferentially of the tire, after the manner of the slots 7.

In practical operation, the inner rim 6 is placed about the felly 1 as shown in Fig. 1 of the drawing, the bolts 15 and 19 being mounted in place, and the nuts 16 and the bolts being tightened up, to hold the inner rim 6 securely on the felly 1. The tire 20 is shrunk onto the inner rim 6, the parts appearing as shown in Fig. 1. After the wheel has been completed as above described, all of the bolts 15 and 19 are cut off close to the inner curve of the felly, thus removing the nuts 16.

After a period of use of greater or less extent, the inner rim 6 and the tire 20 may become loose, and an adjustment or tightening is necessary. Under such circumstances, the shims 8 are removed, so that the felly 1 can contract circumferentially. Then the screws 23 are rotated, and caused to move outwardly, because the screws are threaded into the nuts 21. When the screws 23 move outwardly, their outer ends bear against the inner surface of the rim 6, forcing the rim 6 outwardly until it contacts with the tire 20. At the same time, by the operation above described, the felly 1 will be moved inwardly and will be crowded against the shoulders 5 of the spokes 4. Since the shim 8 has been removed, the felly 1 is permitted to contract circumferentially, to a sufficient extent so that the inner curve of the felly will coact with the shoulders 5. It has been pointed out hereinbefore that the bolts 19 and 15 have been cut off, as shown at 30, adjacent the inner curve of the felly 1. The bolts, therefore, will not hold the inner rim 6 tightly on the felly 1, but permit the inner rim to expand circumferentially, under the action of the screws 23, the function of the elongated slots 11 and 17 now being obvious. The screws 26 may be advanced to enter the openings 29 of the tire 20, and thus the tire will be prevented from moving laterally.

In the drawings, all of the parts hereinbefore described, have been shown as mounted in a comparatively short section of the wheel. It will be understood, however, that these parts may be distributed as desired around the circumference of the wheel, the drawings having been prepared in the matter above outlined, in order that the invention may be shown in comparatively small compass and on a relatively large figure.

The inner rim 6 is not shrunk onto the felly 1, since if such a procedure were resorted to, the inner rim could not be removed from the felly when repairs were necessary. The ends 10 of the inner rim 6 are separated, as clearly shown in Fig. 1, and are not welded together, it being unnecessary, therefore, to cut the inner rim 6, when repairs are required. The inner rim 6 is secured to the felly 1 by means of the bolts 15, and the ends 10 of the inner rim are left separated, as shown in Fig. 1. The bolts 15 hold the inner rim in place temporarily until the outer tire 20 is shrunk (either hot or cold) onto the inner rim. Especial attention is directed to the slots 11. These slots permit the necessary movement of the inner rim 6, circumferentially of the wheel, when the outer tire 20 is shrunk up. The construction is such that the structure will have a uniform curvature and will be of true circular outline, there being no bulging at spaced points circumferentially of the structure.

In making the wheel originally, the outside tire 20 is shrunk onto the inner rim 6, and since the ends 10 of the inner rim 6 are spaced as shown in Fig. 1, the outer tire 20 and the inner rim 6 will grip the felly 1 closely. After a period of use, however, the outer tire 20 may become slightly loose. The operator, if upon the road, simply manipulates the screws 23 and the outer tire 20 thus is tightened up. If, however, the device is taken to a shop, the outer tire 20 may be shrunk up, preferably by cold shrinking. It is obvious that if the bolts 15 were not mounted in elongated slots, such as the slots 11, an equal contraction, all around the circumference of the wheel, could not be secured. However, owing to the presence of the slots 11, a true wheel is secured, and wear is taken care of by the procedure above outlined.

Having thus described the invention, what is claimed is:—

1. In a device of the class described, a felly; a trough-shaped inner rim mounted on the felly and including flanges engaging the sides of the felly; a tire surrounding the rim; screws threaded into the felly and bearing on the inner face of the rim; and screws threaded into the felly and passing loosely through the rim, the tire having elongated openings into which the outer ends of the last specified screws may be advanced, to prevent a lateral movement of the tire with respect to the rim.

2. In a device of the class described, a felly comprising relatively movable ends; a removable shim disposed between said ends; spokes comprising tenons entering the felly, and including shoulders engaging the inner curve of the felly; a trough-shaped inner rim mounted on the felly and including side flanges engaging the sides of the felly; a tire surrounding the rim; screws threaded into the felly and bearing on the inner face of the rim, the screws being adapted to be advanced, and the shim being adapted to be removed, thereby to force the rim outwardly against the tire and to force the felly inwardly to cause the felly to engage the shoulders of the spokes.

3. In a device of the class described, a felly having relatively movable ends permitting a contraction of the felly; a trough-shaped inner rim mounted on the felly and including flanges engaging the sides of the felly; spokes including tenons received in the felly, and shoulders bearing against the inner curve of the felly; screws threaded into the felly and bearing on the inner face of the rim, the screws constituting means for moving the rim outwardly, and constituting means for moving the felly inwardly, to cause the felly to coact with the shoulders on the spokes; a tire surrounding the rim and engaging the rim when the rim is moved outwardly by the screws; and screws threaded into the felly and passing loosely through the rim, the tire being provided with openings into which the outer ends of the last specified screws are adapted to be advanced, to prevent a lateral movement of the tire with respect to the rim.

In testimony that I claim the foregoing as my own, I have hereto affixed my signature in the presence of two witnesses.

FRED REESE.

Witnesses:
WM. HAWKINS,
C. W. DUNLAP.

Copies of this patent may be obtained for five cents each, by addressing the "Commissioner of Patents, Washington, D. C."